(12) United States Patent
Silva et al.

(10) Patent No.: US 8,170,039 B2
(45) Date of Patent: May 1, 2012

(54) METHOD FOR TRANSFERRING DATA IN AN AUTOMATION SYSTEM

(75) Inventors: Paulo Mendes Silva, Wateringen (NL); Karl Weber, Altdorf (DE)

(73) Assignee: Siemens Aktiengesellschaft, Munich (DE)

( * ) Notice: Subject to any disclaimer, the term of this patent is extended or adjusted under 35 U.S.C. 154(b) by 126 days.

(21) Appl. No.: 12/469,877

(22) Filed: May 21, 2009

(65) Prior Publication Data

US 2009/0296736 A1      Dec. 3, 2009

(30) Foreign Application Priority Data

May 28, 2008  (EP) .................................... 08009726

(51) Int. Cl.
*H04L 12/28* (2006.01)
(52) U.S. Cl. ...................................................... 370/406
(58) Field of Classification Search .......... 370/222–224, 370/403–406
See application file for complete search history.

(56) References Cited

U.S. PATENT DOCUMENTS

| | | | |
|---|---|---|---|
| 5,151,899 A * | 9/1992 | Thomas et al. ............... | 370/394 |
| 6,523,696 B1 | 2/2003 | Hashimoto | |
| 7,065,039 B2 * | 6/2006 | Ying ............................. | 370/222 |
| 2001/0047430 A1 * | 11/2001 | Dev et al. ...................... | 709/245 |
| 2003/0118041 A1 * | 6/2003 | Fontana et al. ............... | 370/404 |
| 2003/0134590 A1 | 7/2003 | Suda | |
| 2004/0208575 A1 | 10/2004 | Gumaste | |
| 2009/0303997 A1 * | 12/2009 | Zijst ............................. | 370/390 |
| 2010/0008372 A1 | 1/2010 | Weber | |

FOREIGN PATENT DOCUMENTS

DE   10 2007 004 306      1/2007
EP          1 505 784 A1     2/2005

* cited by examiner

*Primary Examiner* — Derrick Ferris
*Assistant Examiner* — Peter Cheng (57) ABSTRACT

A method of transferring data in an automation system having a plurality of communicatively connected communication stations is provided. The communicative connection of the communication stations follows a predefined hierarchy, in which a plurality of communication stations are grouped together in a line and an alias matched to the hierarchy is assigned to each communication station. Telegrams sent in the automation system designate a destination communication station also by its alias, whereby each line is closed to form a ring by way of its transition, designated as entry point, from the next higher line by way of the entry point, and telegrams in the ring thus resulting with the line are forwarded both in the direction of the hierarchy of the allocated alias designations and also in the opposite direction.

15 Claims, 5 Drawing Sheets

METHOD FOR TRANSFERRING DATA IN AN AUTOMATION SYSTEM

CROSS REFERENCE TO RELATED APPLICATIONS

This application claims priority of European Patent Application No. 08009726.4 EP filed May 28, 2008, which is incorporated by reference herein in its entirety.

FIELD OF INVENTION

The invention relates to a method for transferring data in an automation system having a plurality of communicatively connected communication stations.

BACKGROUND OF INVENTION

Known from the as yet unpublished DE 10 2007 004 306.8 from the applicant of the present invention are a network component, a method for operating such a network component, an automation system having such a network component and also a method for data conveyance in an automation system when using such a network component. The invention described here is a development of the invention described in the aforementioned DE 10 2007 004 306.8, for which reason the latter's complete disclosure is referred to here.

Whereas DE 10 2007 004 306.8 relates to a particularly favorable method for data conveyance in an automation system, a network component provided for this purpose, etc., the invention described here relates to a method for transferring data, which still functions reliably even if communication connections are partially interrupted in the automation system. Methods for the redundant conveyance of data are indeed likewise known, but the redundant conveyance of data proposed here is based on the fact that the communicative connection of the communication stations follows a predefined hierarchy, as is described in DE 10 2007 004 306.8, that an alias matched to the hierarchy is assigned to each communication station, as is likewise described in DE 10 2007 004 306.8, and that frames sent in the automation system, which are also referred to synonymously in the following as telegrams, at least also designate a receiver or destination communication station by means of its alias.

SUMMARY OF INVENTION

An object of the invention is to make the hierarchy and the assignment of alias designations matched to it also usable for an optimized redundant conveyance of telegrams. To this end, provision is made such that entry points arising in the hierarchy of the communicatively connected communication stations act as distribution points for generating redundant telegrams, whereby the lines resulting in accordance with the network topology form hierarchy levels and entry points also act as transitions between the hierarchy levels. Each line is closed to form a ring by way of its entry point or, in the case of redundant network transitions, by way of a plurality of entry points, and a telegram is forwarded in the line both in the direction of the hierarchy of the allocated alias designations and also in the opposite direction. This ensures that communication stations encompassed by the line are reached by the telegram duplicated in the entry point in every case, even if a connection is interrupted along the original line, in other words before it is closed to form a ring by way of the entry point. The same holds true if the telegram is addressed to a communication station which is arranged in a directly or indirectly following line closed to form a ring. The entry point of this line is then reached either in the direction of the allocated alias designations or in the opposite direction, with the result that the forwarding of the telegram is also assured in this case even in the event of interrupted connections.

Advantageous embodiments of the invention are set down in the dependent claims. Back-references used therein point to further development of the subject matter of the main claim by the features of the respective dependent claim; they are not to be interpreted as relinquishing the attainment of independent substantive protection for the combinations of features of the dependent claims to which back-references are made. Furthermore, it must, with regard to an interpretation of the claims, be assumed in the case of a more detailed specification of a feature in a subordinate claim that a restriction of this type is not present in the respectively preceding claims.

Provision is preferably made that telegrams are eliminated on once again reaching a communication station which has already been passed, in particular an infeed point. This serves to ensure that there is no occurrence of continuously circulating telegrams (or frames). That is to say, if a sent telegram arrives back with the original send as a result of redundant conveyance, the latter would forward it "normally" after evaluating the alias designations, with the result that it eventually arrives once again at the original sender on account of redundant conveyance, etc. The result achieved by eliminating such telegrams is the fact that the unavoidable increase in the communication load caused by the redundant sending (duplication) of telegrams is restricted to a minimum.

If the telegram reaches a communication station which has already been passed, it is clear that the telegram has been received once at all the communication stations encompassed by a ring, with the result that the reliable receipt of the user data transported by the telegram is assured with regard to the intended receivers. By particular preference, provision is made that only the communication stations acting as infeed points check whether a telegram which has already been processed once is received. Other communication stations encompassed by the line are then relieved of such management tasks. In addition, a check directly in the area of the communication stations acting as infeed points makes sense against a background where a possibly redundant sending of the same telegram occurs directly in this device.

In order to eliminate such telegrams as have already passed a communication station, an infeed point, once, basically identifiers are evaluated which encode the sender of the respective telegram. Because a multiplicity of telegrams may also occur in a communication relationship between the same sender and receiver pair in a comparatively short period of time, provision is further preferably made such a sequence number is assigned to the telegrams, at least however to a telegram following a redundant sending, in other words to the original telegram and to the telegram duplicate, and telegram duplicates are recognized and eliminated on the basis of identical sequence numbers.

In order to restrict the data volume and the administrative overhead involved in the storage of sequence numbers utilized, provision is made that allocated sequence numbers are noted in a vector and a telegram received with a sequence number is recognized where applicable as a duplicate and eliminated on the basis of the vector. Instead of a table having a multiplicity of sequence numbers, it then only remains for the vector to be held available for duplicate recognition purposes, which, when a favorable notation is used for the sequence numbers, as a power to the base 2 for example, is represented in the result as a binary field and in common data formats, as a long word for example, can encode the use of thirty-two successive sequence numbers.

In order to increase the speed at which evaluation of the vector takes place in respect of possibly allocated sequence numbers, it is predefined that only a section of the vector of predefined or predefinable size is considered for the recognition of possible duplicates. The section is displaced, dependent on time or depending on the receipt of individual telegrams encompassed by the section. Write and read accesses to the vector are managed by means of an offset, which means that it is theoretically possible to manage infinitely large sequence numbers even in the case of a vector of finite size. Because infinitely large sequence numbers are not possible in the case of a software implementation of the method and an actual size restriction on the sequence numbers arises as a result of the data types used for the given situation, once an overflow occurs in respect of the data types used for the given situation, quasi automatically in other words, or as a result of monitoring of particular limit or threshold values in accordance with the respective software implementation on reaching the overflow point or the limit value, smaller sequence numbers are used again automatically, whose renewed use does not encounter any concerns in practice because as a result of the size of the number range used it can be said to be certain that the most recent use of the same sequence number goes back sufficiently far in time such that a sufficiently precise identification of the telegrams continues to be possible.

In order to still also be able, even in the context of such an overflow, to recognize as duplicates telegrams which were provided with sequence numbers prior to such an overflow, and also such telegrams as are already provided with sequence numbers after the overflow, provision is made that the vector is organized in circular fashion such that the temporal relationship between sequence numbers prior to an overflow and sequence numbers after an overflow is maintained.

In the same way as write and read accesses to the vector are managed by means of an offset, the section can also be displaced over the vector by means of a section offset, such that the check as to whether a received telegram represents a duplicate is ascribed to simple arithmetic operations (addition or subtraction) and a comparison process.

The method outlined above with its embodiments, which will be described in detail in the following, is preferably also implemented in software form, whereby the expression "software implemented" here also includes those implementations in which the method is implemented as logic (for example in an ASIC, FPGA and the like) or microcode in a network component acting as a distribution or network node, with the result that the invention also relates to a computer program for executing the method, as described here and in the following. To this end, the computer program (the microcode, the logic, etc.) comprises intrinsically known program code statements such as are required for implementation of the method. In the same manner, the invention also relates to a data medium containing such a computer program or a computer system, namely a communication station in an automation system, in particular an automation device as an example of such a type of communication station, onto which such a computer program is loaded.

BRIEF DESCRIPTION OF THE DRAWINGS

An exemplary embodiment of the invention will be described in detail in the following with reference to the drawing. Objects or elements corresponding to one another are provided with the same reference characters in all the figures. The or each exemplary embodiment is not to be understood as a restriction of the invention. Rather, numerous variations and modifications are possible within the scope of the present disclosure, in particular such variants and combinations which for example by combination or modification of individual features or elements or method steps described in the general or specific part of the description as well as contained in the claims and/or the drawing are derivable for the person skilled in the art with regard to the achievement of the object and by means of combinable features lead to a new subject matter or to new method steps or method step sequences.

In the drawings.

DETAILED DESCRIPTION OF INVENTION

Figure 1:
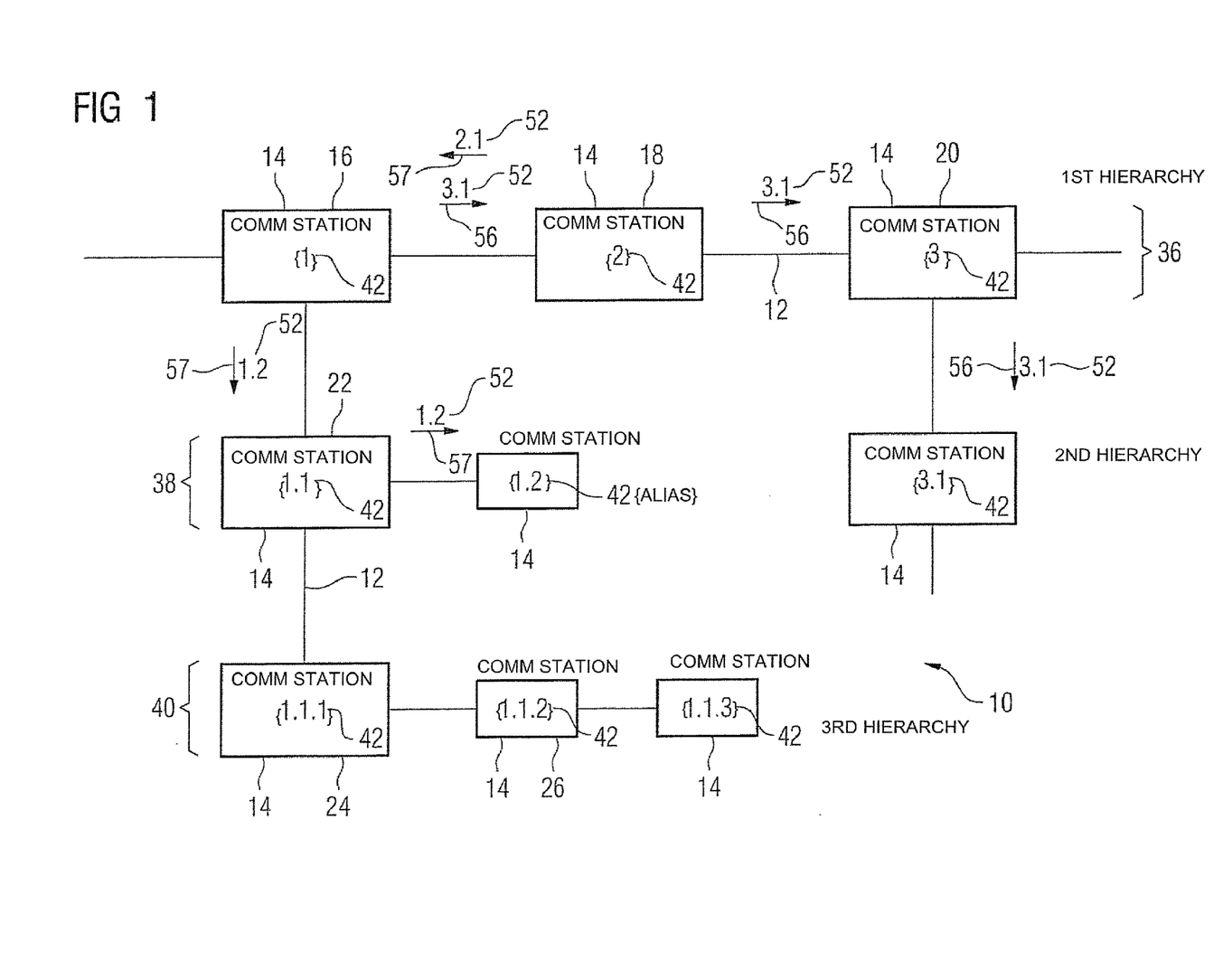
FIG. 1 shows a schematically simplified representation of an automation system which encompasses communication stations connected communicatively by means of a network, at least individual ones of which are embodied as network components according to the present invention.

FIG. 1 shows a schematically simplified representation of an automation system designated in its entirety by 10. The automation system 10 comprises a number of communication stations 14 which are combined in a network 12 and in this respect are communicatively connected with one another.

With regard to individual or all communication stations 14, these are automation devices, in other words for example controllers, such as programmable logic controllers, so-called decentralized peripheral devices, process computers, (industrial) computers and the like or drive control units, frequency converters and similar, in other words devices, facilities or systems such as are used or can be used for control, regulation and/or monitoring of technological processes, for example for working with or transporting material, energy or information etc., whereby in particular energy is expended or converted by way of suitable technical facilities, such as sensors or actuators for example. Only the communication station 14 is represented in each case in a schematically simplified form. Depending on the approach, such a communication station can also be construed as part of an automation device of the type described above, in such a manner that it supplements the functionality of the automation device in question with communication functionalities.

Individual communication stations 14 can be implemented as network components 16, 18, 20, 22, 24, 26 for the purpose of the present invention. Reference is made in the following only to individual communication stations 14 or such types of network components 16-26 or an individual such network component 16-26 because it is of no consequence for an understanding of the invention whether the network component 16-26 is part of a more extensive system, for example a programmable logic controller, or whether the network component 16-26 is part of the automation system 10 without any functionality over and above this. Individual network components 16-26 can in fact be provided as substitutes for existing so-called switches as communication stations 14 in the automation system 10, where they connect individual segments of the network 12 to one another. On the other hand, individual network components 16-26 can be part for example of a programmable logic controller, a master computer or the like and provide the same functionality therein as a discrete network component 16-26. The further description consequently refers only to communication stations 14 and network components 16-26.

Figure 2:
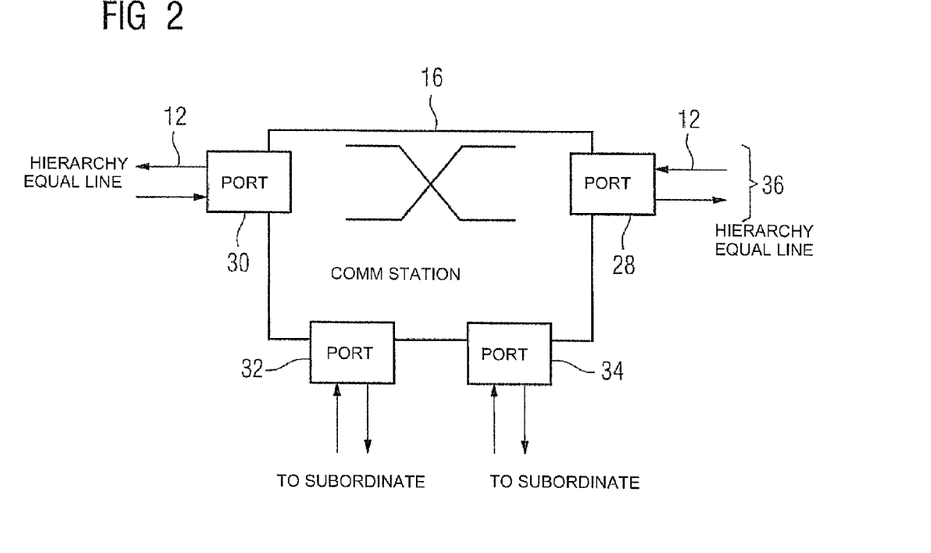
FIG. 2 shows a schematically simplified representation of such a network component.

FIG. 2 shows an individual network component 16. This comprises a first input and output port 28, a second input and output port 30 and a third input and output port 32. In special embodiments of the network component 16 a fourth input and output port 34 and possibly further input and output ports can be provided. The description is continued for network components 16-26 which comprise at least a first, second and third input and output port 28-32—referred to as port 28, 30, 32 for short in the following. In specific applications it is also possible for a network component to also comprise only two ports. These can be implemented simply in a really advantageous manner. Virtually, these often have a third, non-visible port to which the application is coupled.

Each network component 16-26 can receive data from the automation system 10 by way of each of the ports 28-32 or can forward data in the automation system 10. A connection with other communication stations 14 exists or is established by way of the first and second port 28, 30, in particular with other network components 18-26 which, with the respective network component 16 from which the connection originates, belong to a hierarchically equal line 36 (cf. also FIG. 1) of the communication connections in the automation system 10. A connection to other communication stations 14, in particular to other network components 22, 24, exists or can be established by way of the third and possibly fourth and where applicable further ports 32, 34 in a hierarchically subordinate line 38, 40 (cf. FIG. 1).

The first and the second port 28, 30 are thus provided exclusively for data transfers within a hierarchically equal line 36, whereas the third and each possible further port 32, 34 are provided exclusively for data transfers into a hierarchically subordinate line 38, 40. By means of such a unique assignment the transfer of data in the automation system 10 can be organized in accordance with a fixed scheme which facilitates the location of a valid communication path to a destination communication station 14 without there being any additional need, in the individual communication stations 14 passed along the communication path, to store extensive data about indirectly or immediately adjacent communication stations 14. In addition, the data throughput in the automation system 10 can be increased by avoiding parallel data transfers by way of a plurality of ports 28-32, 34 of the same network component 16-26 which were unavoidable in accordance with previous solutions according to the prior art.

In FIG. 1, each communication station 14 is represented by an identifier also referred to as alias 42 in the following. The identifiers "1", "2" and "3" are assigned as alias 42 to the network components 16, 18, 20 encompassed by the hierarchically highest line 36 in the sequence illustrated. Hierarchically beneath the network component 16 with the identifier "1" as alias 42, the automation system 10 comprises two further hierarchically equal lines 38, 40 for the given situation with communication stations 14 encompassed by them, to each of which the identifiers "1.1", "1.2" and "1.1.1", "1.1.2" and "1.1.3" respectively are assigned as alias 42.

Each alias 42 is uniquely assigned in the automation system 10 to a communication station 14. To this end, the formation scheme described in the following is used: Firstly, starting from one central communication station 14, to which an initial alias 42, in other words "1" for example, is assigned on account of its nature as the central communication station 14, for all communication stations 14 which are connected to the central communication station 14 in a hierarchically equal line 36 a part of the respective alias 42 of this communication station 14 designating a first level of the communication connections in the automation system 10 is incremented by an interval from the central communication station. In other words: Starting from the initial alias 42 with the value "1", a part of the respective alias 42 designating the same level of the communication connections is incremented. The identifiers "2" and "3" respectively thus result as alias 42 for the network components 18, 20 following the central communication station 14.

For all the communication stations 14 reached in this manner, which are network components 16-26 of the type described here and with which at least one communication station 14 is connected indirectly or directly by way of their third port 32, an alias 42 is allocated for this communication station 14, which is formed from the alias of the hierarchically superordinate network component 16-20 by adding a part designating a hierarchically subordinate level of the communication connections in the automation system 10. For the network component 16 to which the identifier "1" is assigned as the alias 42, the identifier "1.1" is accordingly allocated as the alias 42 for the network component 22 which can be reached by way of its third port 32, whereby the addition of the part ".1" designates the hierarchically subordinate level of the communication connections in the automation system 10. The same applies to the network component 20, to which the identifier "3" is assigned as alias 42 and whose successor reachable by way of its third port 32 is assigned the alias 42 "3.1" as identifier, whereby the added part ".1" also designates a hierarchically subordinate level here. For a line in a hierarchically subordinate level, in other words for example the further subordinate line 40 following the line 38, further parts of this type are accordingly added to the respective alias 42, such that for the network component 24 designated in FIG. 1 by the reference character 24 the identifier "1.1.1" results as alias 42. If the communication station 14, which is represented in FIG. 1 by the identifier "1.2" as alias 42, is implemented as a network component 16-26 and further communication stations 14 were connected by way of its third port 32, an identifier "1.2.1" would result as alias 42 for a first such communication station 14, and so forth.

For all the network components 16-26, to which an alias which comprises a part that designates a hierarchically subordinate level has been assigned according to the latterly described measures, all measures described above for the formation scheme are repeated, whereby the respective network component takes the place of the central communication station 14 and the respective hierarchical level 36, 38, 40 takes the place of the first level 36 of the communication connections. The formation scheme is thus a recursive formation scheme and at the end of the recursion a unique alias 42 is assigned to all communication stations 14 encompassed by the automation system.

Figure 3:
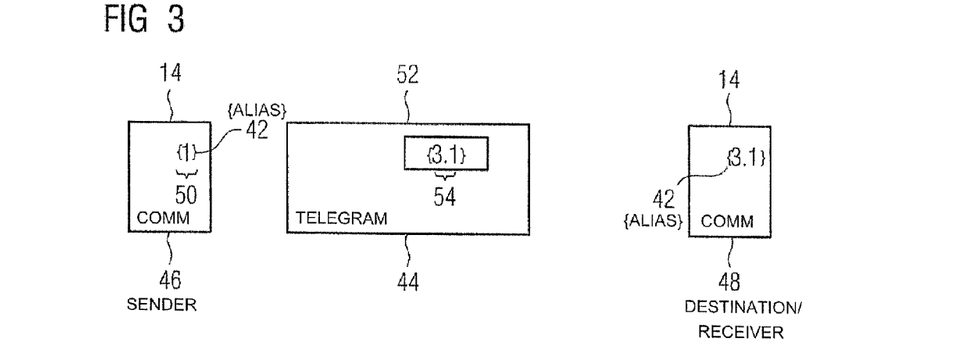
FIG. 3 shows a representation for illustration purposes of identifiers, used with regard to a data transfer in the automation system, of the individual communication stations.

The conveyance of data between individual communication stations 14 in such an automation system will be described in the following with the aid of FIG. 3 with reference to FIG. 1 and FIG. 2. FIG. 3 shows a schematically simplified representation of a telegram 44, in other words an organizational form of data to be conveyed over the network 12 (FIG. 1), for example a so-called frame with at least one datagram encompassed by it. The telegram 44 is sent by a communication station 14 acting as the sender 46 and is intended for a communication station 14 acting as the receiver 48. The receiver 48 is where applicable also referred to as the destination communication station and, because basically any communication station 14 may come into consideration as a destination communication station, where applicable is also designated by the reference character 14 as a generalization.

With regard to the further description it should be assumed that the telegram 44 is to be sent by the network component 16 (sender 46) represented in FIG. 1 by the identifier "1" as alias 42 to the communication station 14 (receiver 48) represented in FIG. 1 by the identifier "3.1" as the alias 42. To this end, the telegram 44 includes as destination alias the alias 42 of the destination communication station 14. It generally holds true that telegrams 44 sent in the automation system 10 between the communication stations 14 designate a receiver 48 or destination communication station 14 at least also by means of its alias 42.

As soon as the telegram 44 is available in the sender 46 for forwarding, in other words for feeding into the network 12, a decision needs to be taken for the sender 46 regarding which of the ports 28-34 encompassed by the sender 46 is to be used for forwarding. To this end, a part of the own alias 42, in other words "1", designating the own level of the sender 46 is initially regarded as the relevant own alias section 50. In addition, a corresponding relevant part is likewise formed of an alias 42 of the receiver 48 (destination alias 52) and is used further as the relevant destination alias section 54. As long as the relevant own alias section 50 and the relevant destination alias section 54 in this sequence satisfy a "less than or equal to" relation, the telegram 44 is forwarded by way of the first port 28 of the network component 16 to 26 in question. In this manner, the telegram 44 represented in FIG. 3 arrives initially from the network component 16 designated in FIG. 1 by the identifier "1" as alias 42 at the network component 18 designated by the identifier "2" as alias 42 and finally at the network component 20 designated by the identifier "3" as alias 42. Here, for the comparison of relevant own alias section 50 and relevant destination alias section 54, the previously satisfied "less than or equal to" relation is no longer satisfied, and instead an "is equal to" relation is satisfied, which has the effect here that the telegram 44 is forwarded by way of the third port 32 and thus arrives at the receiver 48.

The same communication is also illustrated in FIG. 1 by a first group of arrows 56, whereby beside each arrow 56 the destination alias 52 is given in each case and an arrow 56 together with a destination alias 52 can also be construed as a different representation of a telegram 44 (FIG. 3). If at a later point in time a telegram 44 is to be sent from the network component 18 represented in FIG. 1 by the identifier "2" as alias 42 to the communication station 14 represented by the identifier "1.2" as alias 42, analogous circumstances basically result which will be explained in the following with reference to further arrows 58 in conjunction with a destination alias 52, as represented in FIG. 1. Accordingly this results in the fact that as soon as the telegram 44 is ready for sending in the network component 18 acting as sender 46, initially the relevant own alias section 50, in other words "2", is compared to the relevant destination alias section 52, in other words "1". This time, the relevant alias sections 50, 54 satisfy a "greater than or equal to" relation, with the result that the second port 30 is selected for forwarding the telegram 44. The telegram 44 thus reaches the network component 16 represented in FIG. 1 by the identifier "1" as alias 42. Here, from the comparison of relevant own alias section 50 and relevant destination alias section 54, an identity results, such that the third port 32 is selected for forwarding the telegram 44. The telegram 44 thus arrives in the second level 38 but has not yet reached the receiver 48. For the forwarding, for the network component represented by the identifier "1.1" as alias 42, its part of the own alias 42 designating the own level is now formed as the relevant own alias section 50; here the last digit of "1.1", in other words "1". The corresponding part of the destination alias 52 now relates to the same level 38, such that the last digit, in other words "2", now likewise results as the relevant destination alias section 54 of the destination alias 52. Thus, the first port 28 is selected for the forwarding of the telegram 44 to the receiver 48 by the network component 22.

Figure 4:
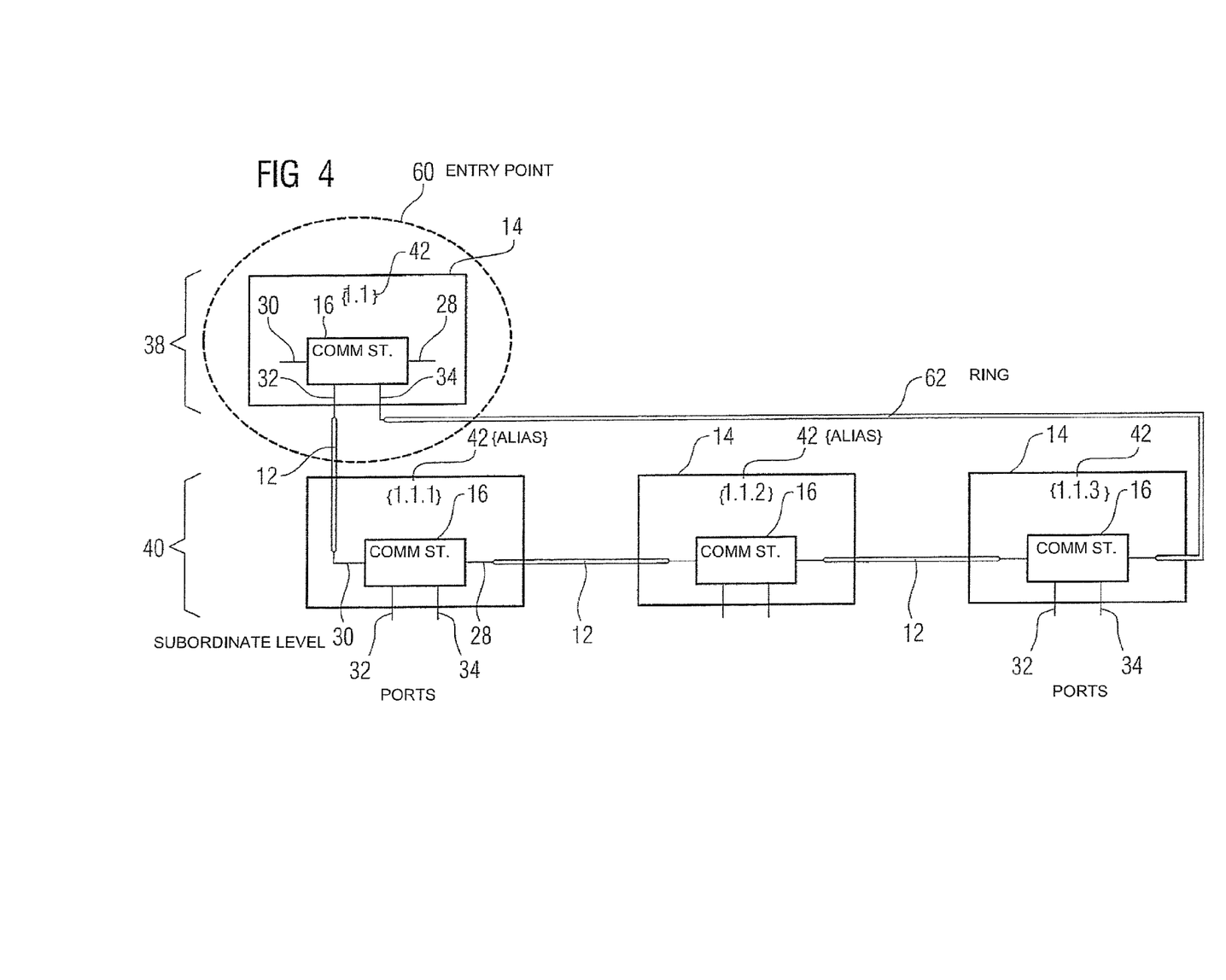
FIG. 4 shows a section of the automation system according to FIG. 1, whereby the line represented with one entry point is closed to form a ring by way of the entry point, such that telegrams in the line and the ring formed for it are forwarded both in the direction of a hierarchy of allocated alias designations and also in the opposite direction.

The structure described above, in which the communication stations 14 are connected with one another by way of ports 28-34 and a plurality of communication stations 14 are grouped together for the given situation in a line 36-40 and, apart from a topmost hierarchy level, each line 36-40 designates precisely one transition at which this line 36-40 is connected to a line 36-40 of a higher hierarchy, is referred to in the following as "predefined hierarchy". The assignment based on this hierarchy in each case of one alias 42 to each communication station 14, as likewise described above, is referred to analogously as "alias assigned to each communication station according to the hierarchy". On the basis of this understanding, FIG. 4 shows a situation in which communication free from interruption is ensured, even if the network 12, in other words individual network sections, consequently connections between individual communication stations 14, are interrupted. If it is assumed with regard to the representation in FIG. 4 for example that the connection between the communication station 14 with the alias 42 "1.1.2" and the communication station 14 with the alias 42 "1.1.3" is interrupted and a telegram 44 is to be sent from the communication station 14 with the alias 42 "1.1" to the communication station 14 after the interrupted connection, in other words the communication station 14 with the alias 42 "1.1.3", this communication station 14 cannot initially be reached without a redundant implementation of the network connections. For the purpose of redundant implementation of the network connections, provision is made that each line 36-40 which includes a transition from a line 36-40 of a higher hierarchy designated as an entry point 60, in other words any line 36-40 which does not itself form the topmost hierarchy level, is closed by way of the respective entry point 60 to form a ring 62. In this situation, the ring 62 originates from the last communication station 14 in the respective line 36-40 and is closed by way of a free port 28-32 of the entry point 60. In this way, provided a maximum of one interruption occurs in a line 36-40, each communication station 14 remains accessible. For the forwarding of a telegram the scheme described above, in which for the given situation for a forwarding communication station 14 the relevant own alias section 50 and a relevant destination alias section 54 are placed in a relation, is extended in such a manner that, if relevant own alias section 50 and relevant destination alias section 54 satisfy an "is equal to" relation, the telegram is simultaneously forwarded by way of the third port 32 and the fourth port 34. The forwarding by way of the third port 32 causes a forwarding of the telegram in the direction of the hierarchy of the allocated alias designations. The forwarding by way of the fourth port 34 causes a forwarding of the telegram in the opposite direction, in other words opposite to the direction of the hierarchy of the allocated alias designations. The forwarding in both directions has the effect that even if a connection is interrupted within a line 36-40 the respective telegram 44 reaches the receiver 48 either in the direction of the hierarchy of the allocated alias designations or in the opposite direction.

Furthermore, there are additional forwarding rules which will be described at least cursorily in the following: to this end the first port 28 is designated by the letter S, the second port 30 by the letter P, the third port 32 by the letter B and the fourth port 34 by the letter B'. Telegrams 44 which are received at an entry point 60 by way of the second port 30 (port P) for forwarding by way of the third port 32 (port B) are—as described above—also always forwarded by way of the fourth port 34 (port B'). Using the notation just introduced, the forwarding strategy for a redundant conveyance of telegrams can be represented as follows in tabular form:

| received at | for forwarding by way of | additional forwarding by way of |
|---|---|---|
| P | B | B' |
| S | B | B' |
| B | B | B' |
| B' | B | B |
| B | P | S |
| B | S | P |
| P | P | S |
| S | S | P |

If no communication station 14 with a third and fourth port 32, 34 is available in the case of an entry point 60, two communication stations 14 and the third port 32 of each of these two communication stations 14 can be used as the entry point. This arrangement is therefore also advantageous because in the event of failure of one of the communication stations 14, which now act in pairs (redundantly) as entry point 60, then the complete communication with the subordinate level is not broken off, because the subordinate level is still possible by way of the communication station 14 which has not failed. The third port 32 of the second communication station 14 of such an entry point then assumes the function of the ports designated above by P',S',B' on the further node and a possible forwarding to this port always also comprises a transition between the two communication stations 14 forming the entry point 60. The forwarding scheme can thus be expressed by analogy with the scheme already formulated above as follows:

| received at | for forwarding by way of | additional forwarding by way of |
|---|---|---|
| B | B | S to B' |
| B' | B | P' to B |
| P | B | S to B' |
| S | B | |
| P' | B | B' |
| S' | B | B' |

If a telegram 44 is forwarded into a line 36-40 from two directions, in other words once in the direction of the hierarchy of the allocated alias designations and in the opposite direction, there results a duplicate of the telegram 44 which results in an additional communication load that is initially unavoidable. At the latest when a telegram 44 once again reaches an infeed point 60 which has already been passed, the telegram 44 can however be eliminated such that the unavoidable additional load is kept within narrow limits. If for example according to the situation represented in FIG. 4 a broadcast or multicast telegram, in other words a telegram 44 which is directed to all communication stations 14 or to a plurality of communication stations 14, is forwarded by way of the communication station 14 with the alias 42 "1.1" as entry point 60 into the line 40 which follows it, both the telegram 44 which is forwarded by way of the third port 32 along the direction of the hierarchy of the allocated alias designations and also the duplicate of the telegram 44 which is forwarded in the opposite direction, in other words by way of the fourth port 34, arrive again within a finite time at the entry point 60. There it is recognized that the telegram 44 or the duplicate has already passed the infeed point 60 once and is now accordingly reaching the infeed point 60 again and will be eliminated on the basis of this finding.

For such an evaluation, in other words the recognition of whether a telegram 44 has already been forwarded once and is now reaching the entry point 60 again, identifiers which reference the respective sender and receiver are evaluated. The situation can however arise where certain sender/receiver relationships occur frequently, with the result that no adequately reliable recognition of duplicates is possible only with this information. To this end, provision is then made that telegrams are supplemented with a sequence number and telegram duplicates are recognized and eliminated at least also on the basis of identical sequence numbers.

Figure 5:
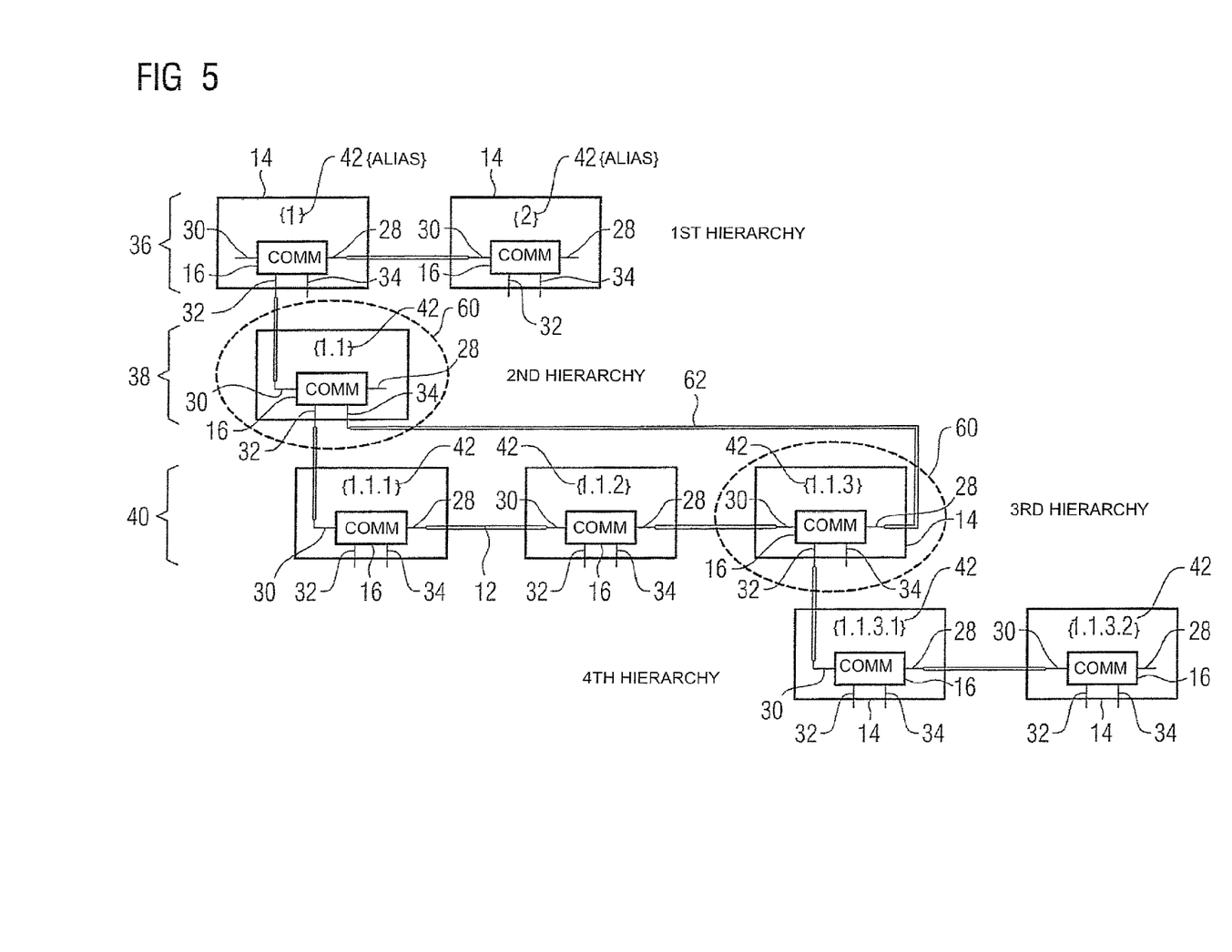
FIG. 5 shows a representation corresponding essentially to the representation in FIG. 4 in order to illustrate that a redundant forwarding of telegrams is also possible beyond a line closed to form a ring and ensures that a communication station situated outside the line is reliably reached.

The representation in FIG. 5 essentially takes up again the representation from FIG. 4 and is intended to illustrate that the redundant conveyance of telegrams as described previously can be used not only for communication relationships within one line 36-40 but also for communication relationships which extend over one or more redundantly implemented lines. If, according to the situation represented in FIG. 5, the communication station 14 with the alias 42 "1.1.3.2" sends a telegram 44 to the communication station 14 with the alias 42 "2", the telegram 44 is forwarded after the communication station 14 with the alias 42 "1.1.3" in the line 40 to which this communication station 14 belongs, both in the direction of the allocated alias designations and also in the opposite direction, such that even in the event of an interruption of the connection in this line 40 the telegram 44 still reaches the receiver, in other words the communication station 14 with the alias 42 "2". The same applies correspondingly to a "reversed" communication direction, for example for a telegram 44 to be sent by the communication station 14 with the alias 42 "1" to the communication station 14 with the alias 42 "1.1.3.1".

Because duplicates of telegrams only arise in the case of infeeding or outfeeding nodes, in other words at an entry point 60, which depending on the communication direction can also be understood to be an exit point, provision is made that a recognition of duplicates is only performed by communication stations 14 acting as an entry point 60. Circulating telegrams on the other hand should also be recognized within a line 36-40 by any node, in other words any communication station 14 encompassed thereby. To this end, provision is made that the information evaluated for this purpose, in other words at least sender information, where applicable also receiver information and/or entry address, where applicable supplemented by a sequence number, are arranged "to the front" as far as possible in a telegram 44 such that this information is available for evaluation purposes on receipt of a telegram 44 virtually immediately and not only after the user data content of a telegram 44 has also been processed.

Figure 6:
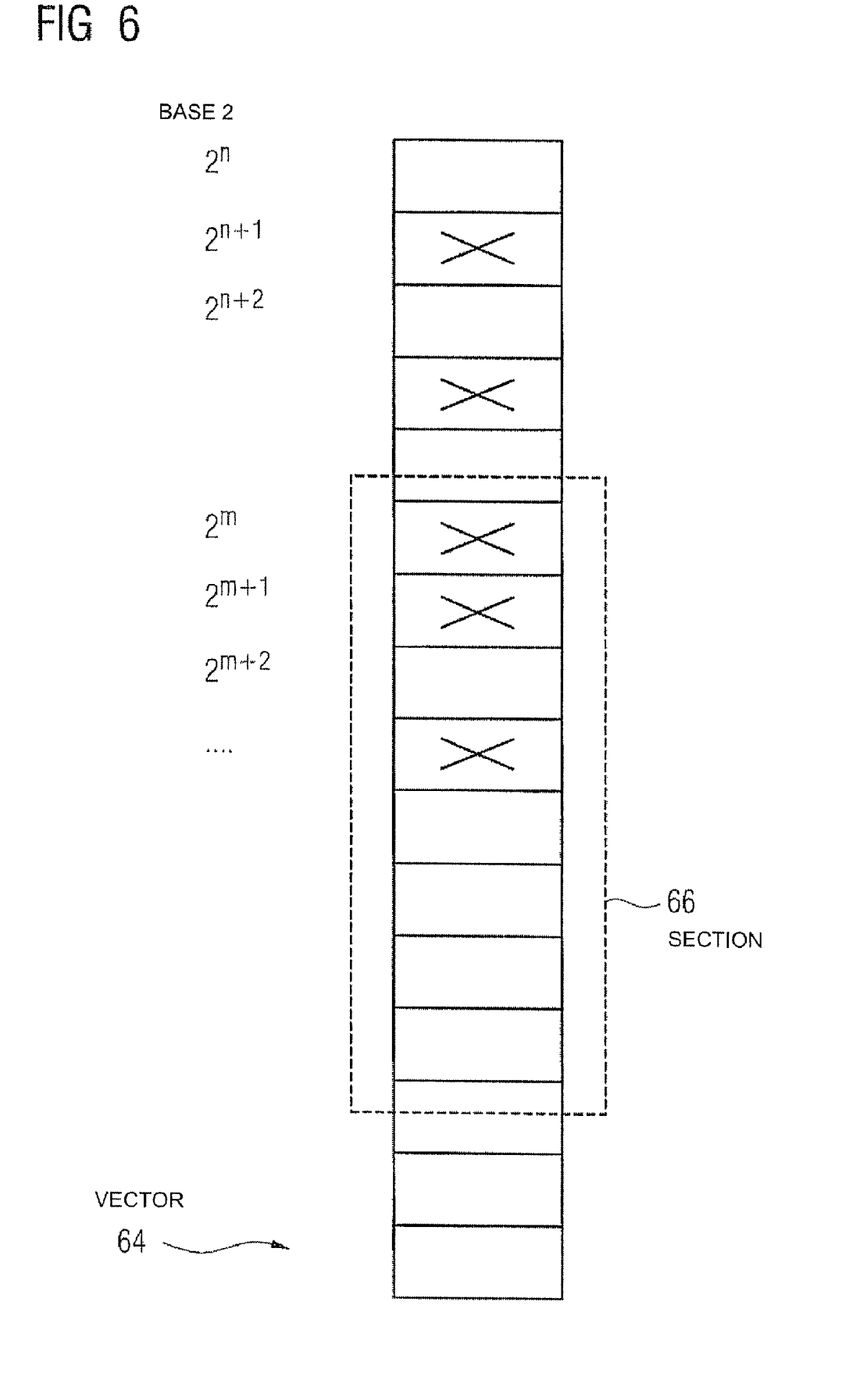
FIG. 6 shows a schematically simplified representation of a data structure referred to in the description as a vector, in which sequence numbers allocated for the recognition of telegram duplicates are stored.

FIG. 6 shows a facility for logging allocated sequence numbers. To this end, a vector 64 is provided which comprises a number of positions and is thus implemented for example as a field, in other words as an array, when the method is realized as software. Basically, positive integers come into consideration as sequence numbers, in other words for example 1, 2, 3, etc. Because new sequence numbers must always be used in order to provide unique identification of telegrams 44, while on the other hand the vector 64 cannot be infinitely large, the need arises to log only a limited number of sequence numbers because old sequence numbers are scarcely still of interest after a certain time because it is to be assumed that possible duplicates have already been eliminated. If each sequence number is entered into the vector 64 as a power to the base 2, an easy assignment between sequence number and position results in the vector 64. A sequence number used, for example n+1, can be entered into the vector 64 and for the recognition of duplicates on receiving a telegram 44 with the same sequence number a communication station 14 acting as an entry point 60 evaluates the vector 64 at the position specified by the sequence number and eliminates the telegram 44 if the sequence number emerges from the vector 64 as occupied. For further optimization and in order to reduce the sequence numbers to be checked during the recognition of duplicates provision can be made that only one section 66 from the vector 64 is evaluated, which can be understood as a window which can be moved over the vector 64. The size of the section 66 can be predefined or can be changed by individual applications at runtime, in other words can be predefined by the respective application at runtime. If a sequence number is reached for whose coding no further position is free in the vector 64, in other words for example a sequence number thirty-three or greater in the case of a vector 64 having thirty-two positions, provision is made that an offset, which is subtracted from the sequence number in question before a position is occupied in the vector 64, is associated with the vector 64. By this means, sequence numbers of any magnitude can theoretically be logged, whereby the magnitude of the sequence numbers is limited only by the data format used in each case.

The section 66 is displaced across the vector 64 in time-dependent fashion or depending on the receipt of individual telegrams 44 encompassed by the section 66, such that under optimum circumstances only those codings are encompassed by the section 66, for which a duplicate is still to be reckoned with. The vector 64 is preferably managed in circular fashion, whereby a circularity already arises as a result of an overflow of a data format used for the given situation, for example in such a manner that in an 8-bit wide data format the sequence number 0 directly follows the incrementation of a sequence number 255 and thus yields a seamless transition as it were from the end to the beginning of the vector 64 and thus a circularity.

Just as write and read accesses to the vector 64 are managed by means of an offset, the position of the section 66 is also displaced by means of a section offset.

To summarize, the invention can thus be described as follows: The invention relates to a method for transferring data in an automation system 10 having a plurality of communicatively connected communication stations 14, whereby the communicative connection of the communication stations 14 follows a predefined hierarchy, in which a plurality of communication stations 14 are grouped together in a line 36 and an alias matched to the hierarchy is or becomes assigned to each communication station 14 and whereby telegrams 44 sent in the automation system 10, to some extent also referred to as datagram or frame, designate a destination communication station 14 at least also by means of its alias 42, whereby each line 36-40 is closed to form a ring 62 by way of its transition, designated as entry point 60, from the next higher line 36-40 by way of the entry point 60, and telegrams 44 in the ring 62 thus resulting with the line 36-40 are forwarded both in the direction of the hierarchy of the allocated alias designations and also in the opposite direction.

The invention claimed is:

1. A method of transferring data in an automation system having a plurality of communication stations being communicatively connected via communication lines in a hierarchically arranged topology having a plurality of hierarchy levels of communication stations connected via respective entry points, wherein each entry point forms a ring of connected communication stations for the respective level via the entry point, the method comprising:

assigning to each communication station a unique identifier comprising an alias, wherein the alias uniquely identifies each communication station and the hierarchy level of each communication station by using a nested notation based on hierarchy levels;

designating a first and a second port in each communication station exclusively for transmitting data within each communication station's own hierarchy level along a hierarchically equal line;

designating a third or more ports in each communication station exclusively for transmitting data into a subordinate hierarchy level;

designating in a telegram to be sent from a sending communication station to a destination communication station a destination alias to identify the destination communication station;

forwarding the telegram from the sending communication station to the proper hierarchy level based on the nested notion, wherein telegrams destined for a communication station's own hierarchy level are transmitted along the hierarchically equal line via the first and second port and wherein telegrams destined for a subordinate hierarchy level are transmitted via the third or more ports into the subordinate hierarchy level;

upon entry to each hierarchy level via a respective entry point, duplicating the telegram received from the sending communication station for redundant sending, assigning a sequence number to provide a unique identification for the telegram, sequentially logging the sequence number into a position within a vector having a limited number of positions, wherein the vector is arranged such that logging occurs in a circular fashion, and forwarding the telegram in the ring in both directions;

when the telegram has reached again the entry point in the ring which has already been passed thereby assuring that the telegram has been received at least once at all communication stations encompassed by the ring, eliminating the telegram at the entry point by recognizing whether the sequence number is a duplicate by evaluating only a section of positions in the vector rather than the entire vector, wherein the section of positions to be evaluated is displaced across the vector; and receiving the telegram at the destination communication station.

2. The method as claimed in claim 1, wherein the nested notion comprises:
   dot notation to identify nested levels {n.n.n ... }, such that {n} identifies communication stations on a first hierarchy level, {n.n} identifies communication stations on a second hierarchy level, and {n.n.n} identifies communication stations on a third hierarchy level.

3. The method as claimed in claim 1,
   wherein the section of the vector is a predefined size in the vector for the recognition of possible duplicates.

4. The method as claimed in claim 1, wherein displacing the section across the vector is dependent on time or dependent on the receipt of individual telegrams encompassed by the section.

5. The method as claimed in claim 1, further comprising: managing write and read accesses to the vector by an offset.

6. The method as claimed in claim 1, further comprising: displacing the section of the vector by a section offset.

7. A non-transitory computer readable medium storing a computer program that, when executed on a computer system, performs a method of transferring data in an automation system having a plurality of communication stations being communicatively connected via communication lines in a hierarchically arranged topology having a plurality of hierarchy levels of communication stations connected via respective entry points, wherein each entry point forms a ring of connected communication stations for the respective level via the entry point, the method executed by the computer system comprising:
   assigning to each communication station a unique identifier comprising an alias, wherein the alias uniquely identifies each communication station and the hierarchy level of each communication station by using a nested notation based on hierarchy levels;
   designating a first and a second port in each communication station exclusively for transmitting data within each communication station's own hierarchy level along a hierarchically equal line;
   designating a third or more ports in each communication station exclusively for transmitting data into a subordinate hierarchy level;
   designating in a telegram to be sent from a sending communication station to a destination communication station a destination alias to identify the destination communication station;
   forwarding the telegram from the sending communication station to the proper hierarchy level based on the nested notion, wherein telegrams destined for a communication station's own hierarchy level are transmitted along the hierarchically equal line via the first and second port and wherein telegrams destined for a subordinate hierarchy level are transmitted via the third or more ports into the subordinate hierarchy level;
   upon entry to each hierarchy level via a respective entry point, duplicating the telegram received from the sending communication station for redundant sending, assigning a sequence number to provide a unique identification for the telegram, sequentially loving the sequence number into a position within a vector having a limited number of positions, wherein the vector is arranged such that logging occurs in a circular fashion, and forwarding the telegram in the ring in both directions;
   when the telegram has reached again the entry point in the ring which has already been passed thereby assuring that the telegram has been received at least once at all communication stations encompassed by the ring, eliminating the telegram at the entry point by recognizing whether the sequence number is a duplicate by evaluating only a section of positions in the vector rather than the entire vector, wherein the section of positions to be evaluated is displaced across the vector; and
   receiving the telegram at the destination communication station.

8. The non-transitory computer readable medium as claimed in claim 7, wherein the nested notation comprises:
   dot notation to identify nested levels {n.n.n ... }, such that {n} identifies communication stations on a first hierarchy level, {n.n} identifies communication stations on a second hierarchy level, and {n.n.n} identifies communication stations on a third hierarchy level.

9. The non-transitory computer readable medium as claimed in claim 7, wherein the section of the vector is a predefined size in the vector for the recognition of possible duplicates.

10. The non-transitory computer readable medium as claimed in claim 7, wherein displacing the section across the vector is dependent on time or dependent on the receipt of individual telegrams encompassed by the section.

11. The non-transitory computer readable medium as claimed in claim 7, the method further comprising:
    managing write and read accesses to the vector by an offset.

12. The non-transitory computer readable medium as claimed in claim 7, the method further comprising:
    displacing the section of the vector by a section offset.

13. An automation device, comprising:
    a plurality of communication stations being communicatively connected via communication lines in a hierarchically arranged topology having a plurality of hierarchy levels of communication stations connected via respective entry points, wherein each entry point forms a ring of connected communication stations for the respective level via the entry point; and
    a computer readable medium storing a computer program that, when executed on the automation device, performs a method, comprising:
    assigning to each communication station a unique identifier comprising an alias, wherein the alias uniquely identifies each communication station and the hierarchy level of each communication station by using a nested notation based on hierarchy levels;
    designating a first and a second port in each communication station exclusively for transmitting data within each communication station's own hierarchy level along a hierarchically equal line;
    designating a third or more ports in each communication station exclusively for transmitting data into a subordinate hierarchy level;
    designating in a telegram to be sent from a sending communication station to a destination communication station a destination alias to identify the destination communication station;
    forwarding the telegram from the sending communication station to the proper hierarchy level based on the nested notion, wherein telegrams destined for a communication station's own hierarchy level are transmitted along the hierarchically equal line via the first and second port and wherein telegrams destined for a subordinate hierarchy level are transmitted via the third or more ports into the subordinate hierarchy level;
    upon entry to each hierarchy level via a respective entry point, duplicating the telegram received from the sending communication station for redundant sending, assigning a sequence number to provide a unique identification for the telegram, sequentially logging the sequence number into a position within a vector having a limited number of positions, wherein the vector is arranged such that logging occurs in a circular fashion, and forwarding the telegram in the ring in both directions;

when the telegram has reached again the entry point in the ring which has already been passed thereby assuring that the telegram has been received at least once at all communication stations encompassed by the ring, eliminating the telegram at the entry point by recognizing whether the sequence number is a duplicate by evaluating only a section of positions in the vector rather than the entire vector, wherein the section of positions to be evaluated is displaced across the vector; and receiving the telegram at the destination communication station.

14. The automation device as claimed in claim 13, wherein the nested notation comprises:
   dot notation to identify nested levels {n.n.n ... }, such that {n} identifies communication stations on a first hierarchy level, {n.n} identifies communication stations on a second hierarchy level, and {n.n.n} identifies communication stations on a third hierarchy level.

15. The automation device as claimed in claim 13, wherein displacing the section across the vector is dependent on time or dependent on the receipt of individual telegrams encompassed by the section.

* * * * *